(12) United States Patent
Barber

(10) Patent No.: US 8,800,549 B2
(45) Date of Patent: Aug. 12, 2014

(54) SOLAR ENERGY COLLECTING ASSEMBLY

(71) Applicant: Michael Stuart Barber, New York, NY (US)

(72) Inventor: Michael Stuart Barber, New York, NY (US)

( * ) Notice: Subject to any disclaimer, the term of this patent is extended or adjusted under 35 U.S.C. 154(b) by 0 days.

(21) Appl. No.: 13/717,906

(22) Filed: Dec. 18, 2012

(65) Prior Publication Data

US 2013/0180517 A1 Jul. 18, 2013

Related U.S. Application Data

(60) Provisional application No. 61/578,404, filed on Dec. 21, 2011.

(51) Int. Cl.
*F24J 2/38* (2014.01)
*F24J 2/08* (2006.01)
*F24J 2/05* (2006.01)

(52) U.S. Cl.
CPC .... *F24J 2/08* (2013.01); *F24J 2/38* (2013.01); *F24J 2/055* (2013.01)
USPC ............ 126/700; 126/698; 126/652; 126/600

(58) Field of Classification Search
CPC ................. F24J 2/38; F24J 2/055; F24J 2/08; F24J 2/5406; F24J 2/541; F24J 2/10; F24J 2/1057; F24J 2002/5458; F24J 2002/5475
USPC ........................ 126/600, 652, 700, 698, 712
See application file for complete search history.

(56) References Cited

U.S. PATENT DOCUMENTS

| | | | |
|---|---|---|---|
| 7,926,480 B2 * | 4/2011 | Le Lievre | 126/684 |
| 2009/0173338 A1 * | 7/2009 | Chih | 126/683 |
| 2010/0192944 A1 * | 8/2010 | Gruber | 126/698 |
| 2011/0193512 A1 * | 8/2011 | Singhal et al. | 320/101 |
| 2012/0266941 A1 * | 10/2012 | Ozeki et al. | 136/246 |

* cited by examiner

*Primary Examiner* — Alfred Basichas
(74) *Attorney, Agent, or Firm* — Thomas A. O'Rourke; Bodner & O'Rourke, LLP

(57) ABSTRACT

A solar collection device includes a solar energy collector assembly being received and supported by a base. The solar energy collector assembly includes: a plurality of lenses secured within an elongated holder. Positioned concentric to the axis of the holder is a cylindrical glass shroud through which a tube passes. A first end of the tube, which is preferably formed of a high thermally transmissive metal, receives a supply of water, which is heated within the evacuated glass shroud by sunlight passing through the lenses and being focused onto the tube. The solar collector assembly is rotatably mounted to the base and may be caused to rotate at a slow speed by a drive means, or may be rocked at a slow speed. The elongated holder may be cylindrical, or may have a polygonal cross-sectional shape, with lenses staggered along each side of the holder to increase collection capability.

19 Claims, 20 Drawing Sheets

SOLAR ENERGY COLLECTING ASSEMBLY

CROSS REFERENCES TO RELATED APPLICATIONS

This application claims priority on U.S. Provisional Application Ser. No. 61/578,404, filed on Dec. 21, 2011, the disclosures of which are incorporated herein by reference.

FIELD OF THE INVENTION

The present invention is directed to improvements in the use of solar energy to generate heat. The present invention has particular applicability in the use of solar energy to produce heat which can be harnessed for a variety of uses. The heat for example can be in the form of heated water particularly water heated to a temperature higher than traditional solar hot water heaters have been able to achieve on a sustained basis.

BACKGROUND OF THE INVENTION

Many people are concerned about our dependence upon foreign energy sources. In addition there are environmental issues in using coal and other carbon based fuels. As a result there is a greater desire to use solar energy for more of our energy needs.

One problem with solar energy has been the relatively high cost of solar cells that are used to generate electricity. The materials used in the solar cells, i.e. the silicon wafers and silver ribbons, are fairly expensive. Their cost of manufacture is also high.

Solar collectors have also been used for a number of years for heating water. A solar collector is often secured to a roof or wall surface and positioned so it is facing the sun. The sun heats water or a working fluid that passes through piping in the collector. A pump or natural convection transports the heated fluid to a heat exchanger or a storage tank for use by occupants of the building. Sometimes a parabolic mirror is used to concentrate the sunlight on the tube containing the fluid.

One issue that has inhibited the use of solar collectors has been the relatively low temperatures that are achieved using these devices. Except for really sunny days a supplemental system may also be necessary to really heat the water to high enough temperatures for most uses.

OBJECT OF THE INVENTION

It is an object of the invention to provide a solar collector type device that generates heat from the sun's rays that can be used for a variety of purposes where heat can be used.

It is an object of the invention to provide a solar energy based device for warming water.

It is also an object of the invention to provide a solar collector type device where the temperatures achieved are higher than conventional systems.

It is a further object of the invention to use an adjustable lens to concentrate the focal point of the light on a tube containing a fluid.

It is a still further object of the invention to provide a solar collecting system which takes into account the movement of the sun during the day.

It is still another object of the invention to provide a solar collector system with a main assembly with a plurality of lenses and two auxiliary mirrors to increase the light directed on the tube containing the fluid to be heated.

It is a still further object of the invention to provide a solar collecting system which takes into account the movement of the sun during the day.

It is still another object of the invention to provide a solar collector system with a main assembly that rotates for the lenses to better receive the sun's light.

It is also another object of the invention to provide a solar collecting system in which the main assembly rocks back and forth so that the lenses better receive the sun's light.

It is a still further object of the invention to provide a solar collector which has a spherical configuration.

It is another object of the invention where the solar collector is a sphere that rotates.

It is another object of the invention to provide a solar collector that is generally cylindrical in configuration.

It is a further object of the invention to provide a solar collector that is generally a polygonal tube in configuration

SUMMARY OF THE INVENTION

The present invention is directed to a unique solar collection that can raise the temperature of a fluid to temperatures where the fluid can be used directly as hot water for use in homes and businesses. Alternatively the fluid can be used to heat water in a heat exchanger for similar uses. Depending on the heat generated by the device through the use of the lenses it may be possible to generate steam from water in the device. The present invention has a solar collector which has a housing with a plurality of lenses assemblies. The housing is preferably generally at least a portion of a cylinder. The surface of the cylinder may be curved or made up of a plurality of longitudinal flat strips extending from one end to the other end. The solar collector may have one or more mirror assemblies positioned along the lower portion of the solar collector.

Light from the sun passes through the lens in the lens assembly where it is focused to penetrate past an evacuated glass shroud and be concentrated onto a black pipe, where the fluid to be heated passes through. This arrangement of the black tube within the glass shroud, being supported therein by end caps, which permit evacuation of the air between the tube and the shroud, is referred to hereinafter generally as the "core." The focal point of the lens can be adjusted by the lens assemblies so that the light is focused light and heats a fluid passing therethrough. The solar collector may be rotated so that the sun's rays pass through each of the lens in the lens assemblies. This increases the amount and location where light impinges on the surface of the core during the "passage" of the sun across the sky each day.

Where the solar collector is less than a complete cylinder the collector may be rocked instead of rotated. In addition to the solar collector having a cylindrical configuration or portion thereof the solar collector may be a sphere or hemispherical or spherical arrangement between the two.

DETAILED DESCRIPTION OF THE INVENTION

Figure 1:
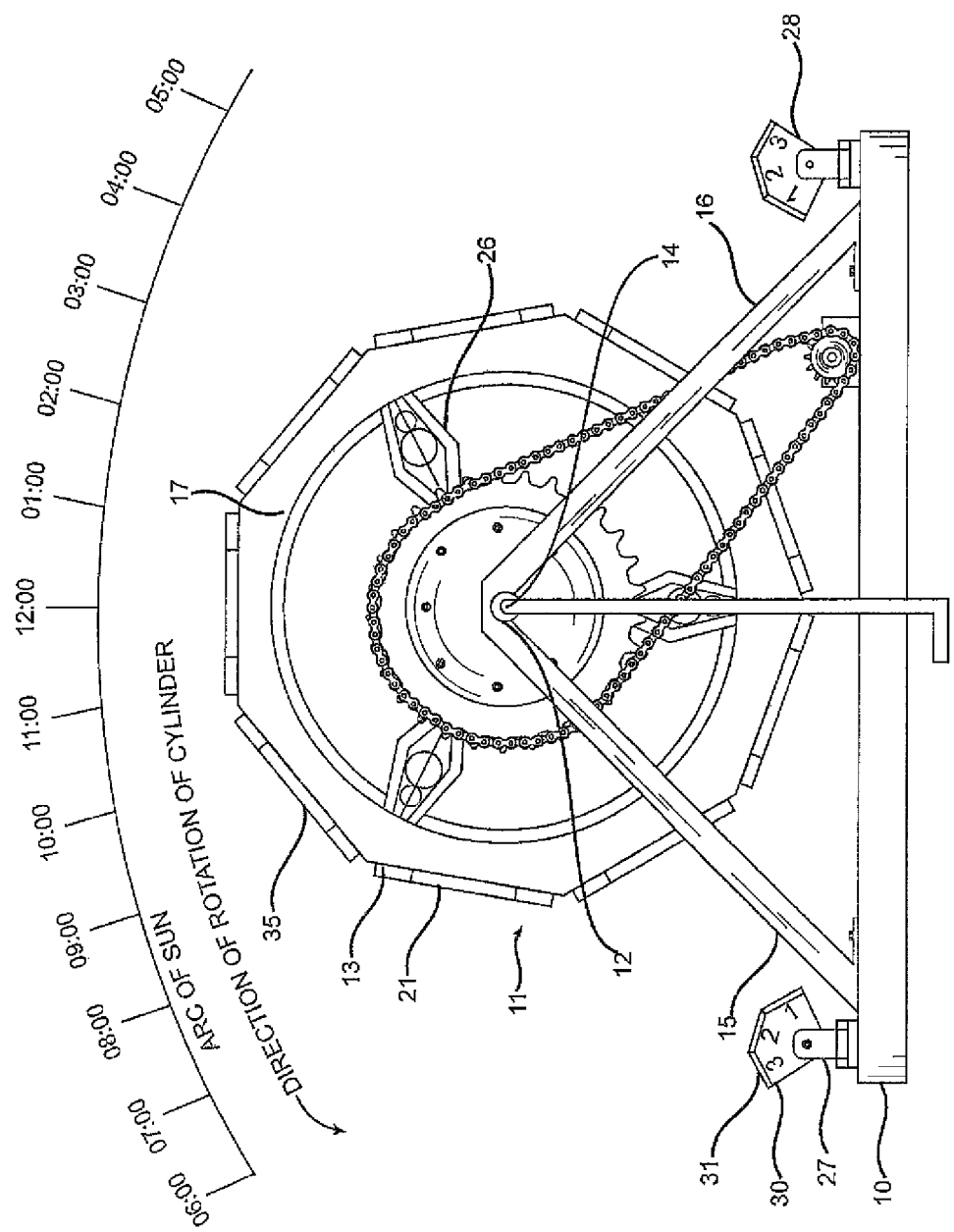
FIG. 1 shows an end view of one embodiment of the present invention.

As seen in FIG. 1 there is a base 10 which supports the solar energy collector assembly 11 of one embodiment of the present invention. In this embodiment the solar energy collector rotates about an axis 12 which is preferably horizontal to the ground or other flat surface. As the device rotates one or more lenses 13 are perpendicular to the sun and placed in position to receive the direct rays of the sun. The rotation enables the device to compensate for movement of the sun across the sky as the earth rotates during the day. The multiplicity of lenses increases the incidence of light onto a tube 14 through which a fluid that is heated passes. While it is preferable that the device be positioned generally horizontal to the ground it can be at any angle to the ground including perpendicular. To compensate for the seasonal tilt of the sun the North end of the device can be raised and lowered so that the lenses are perpendicular to the sun and the rays will directly hit the lenses and the opposite in the southern hemisphere.

The base 10 may be a flat plate that extends from one end of the solar power assembly to the other or it may be a plurality of individual bases that support each respective end of the assembly. Extending upwardly from the base 10 are one or more supports 15 and 16 that support the center axis of the assembly of the present invention and permit the assembly to rotate. The assembly of the present invention is generally a cylindrically shaped hollow tube having first end 17 and a second end 18 and one or more sidewalls 19 extending from one end to the opposite end. It will be appreciated that in addition to a circular cylindrical configuration the cylindrical tube may alternatively have several different polygonal shapes that may be used. These polygonal shapes will have one or more generally flat surfaces extend across the surface of the cylinder from generally near one end to the generally near the opposite end of the cylinder. Preferably the assembly has nine or more sides in the polygon-shaped assembly. The generally cylindrical assembly has an inner surface 20 and an outer surface 21.

At each end of the cylindrical assembly there may be an end wall 22 to provide support for the device. The end wall may be a solid wall surface without any opening across the end of the cylindrical assembly or it may have a ring shaped as shown. Within the cylindrical member there is a center support member or rod or tube 14 which extends from one end of the cylinder to the opposite end of the cylinder. This tube has a couple of purposes. One it acts as a center support for the cylindrical assembly and permits the cylinder to be positioned on the supports 15 and 16 at each end of the device that extend upwardly from the base 10. The center support member 14 enables the cylinder to rotate about the center axis. The center support member is preferably a tubular member having one or more wall surfaces and which is hollow from one end to the other. The center rod is preferably made of metal, such as, for example, stainless steel and more preferably made of a metal that conducts heat. A fluid passes through the hollowed tube. This fluid is heated by the sunlight that passes through the lenses and is focused onto the tube.

As the device of the present invention rotates the light from the sun enters one or more of the lenses 13. The lenses focus the beam of light onto the surface of the center rod. The focused light increases the temperature of the rod particularly in the areas where the light directly impinges on the surface of the rod. This increases the temperature of the rod and it's contents. The outer surface of the cylinder is provided with a plurality of orifices 23 extending from the outer surface 21 of the cylinder through to the inner surface 20. These orifices receive the lens assemblies 13 used in the present invention. The lens assemblies 13 include a lens 24 that can focus the lights that passes through the lens on to the surface of the center rod. The lens are positioned in a height adjustable flexible sleeve 25 that retains the lens in position in the orifice 23 and which can be used to adjust the distance the lens is from the center rod to optimize the focal distance. This permits the light to be better focused on the center rod. In one embodiment the flexible sleeve is a flexible rubber that can cushion the lens in the orifice in the cylinder. This prevents thermal expansion problems caused by heat or cold due to the differences in the coefficient of expansion between the material which the cylinder is made of and the material (e.g. glass) the lens is made of.

Extending from the inner surface of the cylinder wall are one or more cylinder drum supports 26 that extend to the center rod 14 or core of the device. These supports maintain the center rod in the center axis of the device. The core 14 of the device has at least a hollow portion through which a fluid may pass during the heating step. The supports 26 help reduce the amount of weight that the device has, thereby reducing the power needed to rotate the device during use.

On either side of the cylinder extending along its length are bottom side reflectors 27, 28. These reflectors have a base 29 that may be secured to the base 10. Extending upwardly from the base is a support member 30 to hold each end of the reflector 31 in place and enable the reflector to pivot about an axis. In one embodiment as seen in FIG. 1, there is a first mirrored surface, a second mirrored surface, and a third mirrored surface that are held in position by a pivoting mirror base which has an open area between two arms. In this embodiment the arms may be joined at an apex, but it is not necessary. A parabolic or hyperbolic mirror could be used instead if the focal length was sufficient to focus light from them through the lens 13 onto the tube 14. Based on the location of the sun the number of lens in the main assembly, the distance from the center axis, etc., the bottom side reflectors 27, 28 may be adjusted to direct light into the main assembly but they are not required.

At the end of the assembly shown in FIG. 1 there is a drive means for rotating the solar assembly during operation. The drive means may be any type of driving mechanism that rotates the assembly at a slow speed. Preferably, the rotation speed is about 1 to 5 rpm's or less. In the embodiment of FIG. 1 there is a sprocket chain drive 33 with a sprocket disk 34 with a plurality of teeth. The chain drive may be similar to a chain used on a bicycle. The chain is driven by an AC high torque motor 32. The motor 32 is preferably a variable speed motor which can preferably rotate the drum at a speed of about 1 rpm. The purpose of the rotation is to permit the light to fall through at least one and preferably a plurality of lenses at any given time during a rotation cycle and as the sun traverses the sky.

In the preferred embodiment the surface of the cylinder has a series of flat surfaces around the cylinder so that during rotation of the earth, the suns rays will fall directly on the lens so that the lens can focus the light onto the surface of the center core thereby increasing the heat of the core. Depending on the arrangement of the lenses across the surface of the drum, at any given time when the surface of the drum is perpendicular to the sun's direct rays there should be focused light impinging onto the surface of the core thereby heating the core and the fluid being transported within it.

The assembly is preferably arranged as close as possible to a north south configuration when the device is in operation. The device may also preferably be adjusted so that the North end can be higher than the south end to allow for seasonal tilting of the earth on its axis. This will permit the rays to directly impinge on one or more lenses and provide the optimal performance when the lens axis is at a 90°. When the light passes through a lens, the lens focuses the light to a point on the surface of the tube that is the center axis or core of the device. When a user is facing the south, the cylinder rotates counter clockwise. i.e. in the opposite direction as the sun appears to be moving in the sky so that the light passes through different lenses as the solar collector rotates thereby spreading the heat evenly across the surface of the tube.

FIG. 1 shows the movement of the sun in relation to the device. As the sun rises in the sky the rays of light hit the east side of the drum. Light enters the lens where it is focused by the lens into a point on the surface of the core along the center axis. This light warms the surface of the core and because the core is made from a material that conducts the heat, the fluid passing through the core is warmed as well. This fluid passes out of the core to where the heat can be used for any suitable purpose. In one embodiment, a heat exchanger 37 can be used to heat potable water for household use. In another embodiment, the fluid itself can be used in other applications as well.

The lens assembly is preferably selected based on where on the surface of the cylinder the lens will be placed. Where the lens will be in the center row it is preferable that the lens be positioned in the orifice 23 on the assembly so that the long axis of the lens is perpendicular to the light entering into the lens from the sun. On each side of the center row it is preferable that the lens assembly 35 have a tilt so the lens is positioned at about 15° off of the center axis of the lens to better aim the light onto the center rod.

Figure 2:
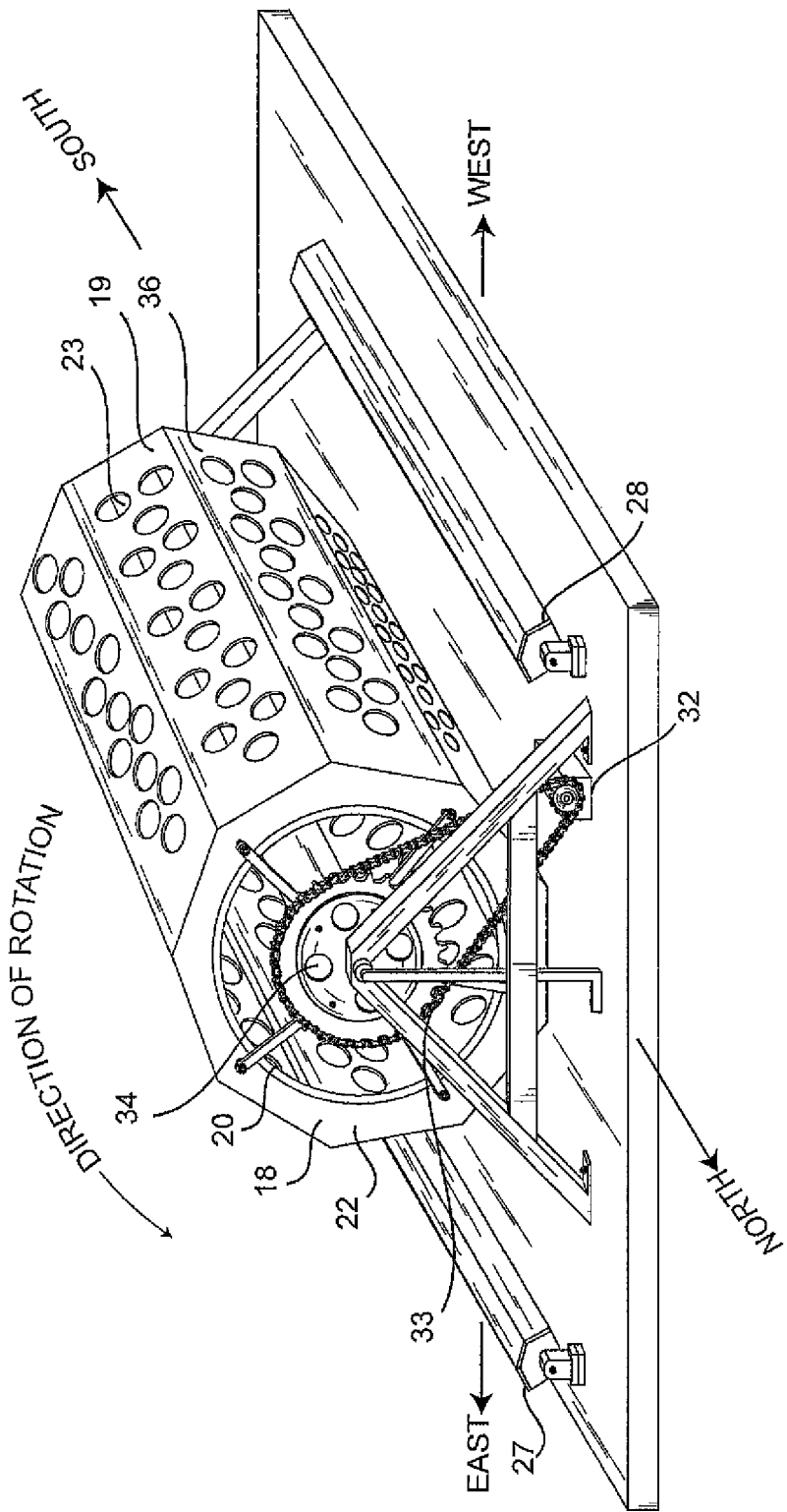
FIG. 2 shows a perspective view of the embodiment of FIG. 1.

FIG. 2 shows a perspective view of the assembly of the present invention. As seen in the Figure the surface of the drum is provided with three rows of orifices 23. While these rows are shown in straight lines, other configurations are possible. The rows are preferably offset slightly as shown in the Figure. This can permit more lens in the given surface area of the flat strip 19.

FIG. 2 also shows how light is reflected off of the bottom side reflectors 27 and 28 and directed to lens assemblies on lower strips 36 of the solar collector. In addition, there can be a reflective surface on the base 10 to direct light on the underside of the solar collector.

Figure 3:
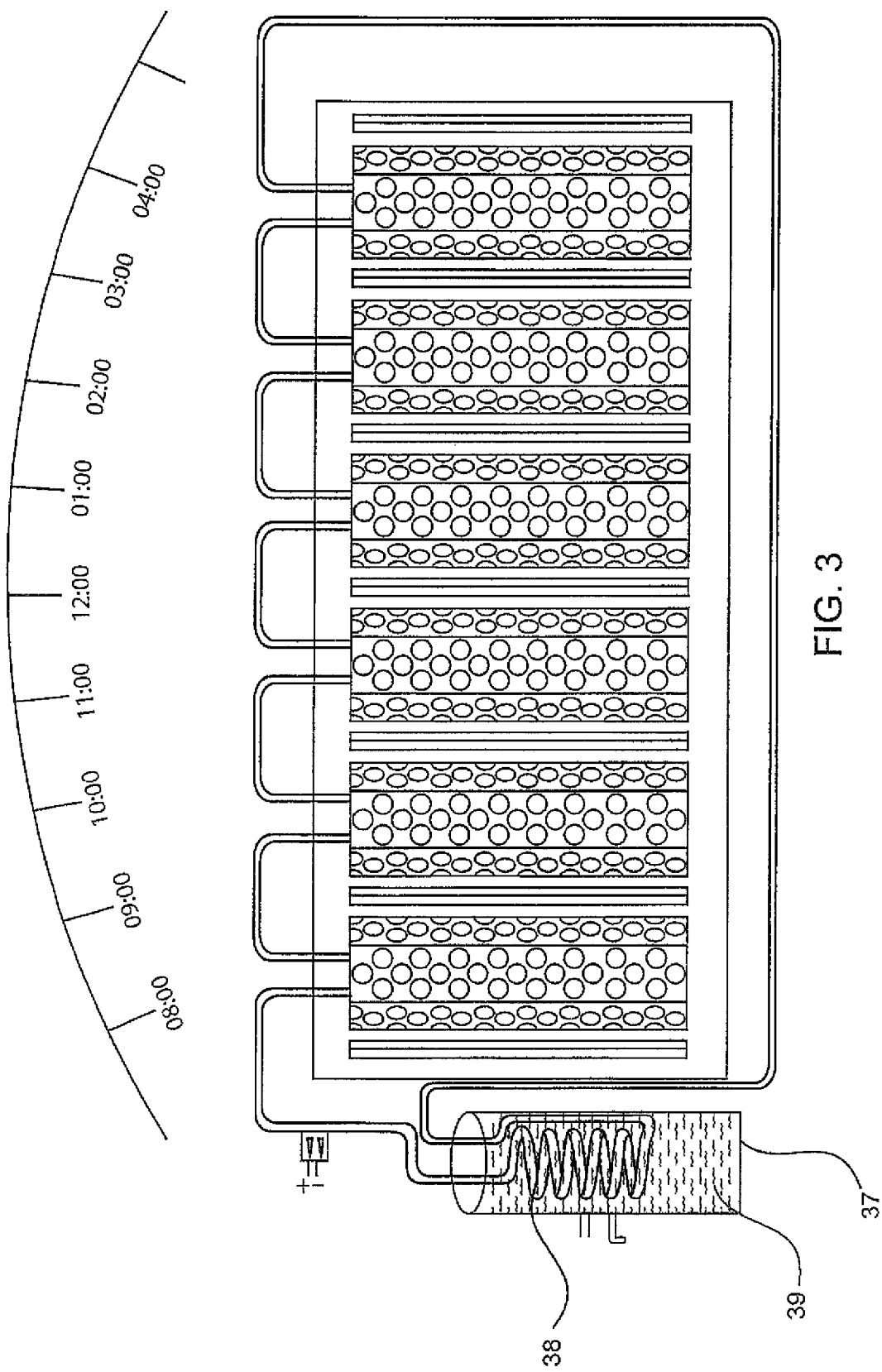
FIG. 3 shows a top view of an array of several devices of the present invention.

FIG. 3 shows an example of an array of solar heating assemblies that may be placed on a roof or on the ground. The assemblies are lined up adjacent to each other in the example but could be end to end if the space was available. In another embodiment, the array can be pyramidal, i.e. higher in the center than at the ends, although any configuration is possible based on space requirements. The fluid travels through the center rod of each of the assemblies being heated as it goes through each one. When the fluid's travel through the array is completed, it passes into a heat exchanger 37 which can heat for example, water for use in a shower, or to heat a hot water heating system in a house. In the example shown in FIG. 3 the heat exchanger 37 is in the form of a coil 38 that warms a second fluid 39 in a storage unit. The fluid being heated can include but is not limited to water, oil or a glycol antifreeze.

Figure 4:
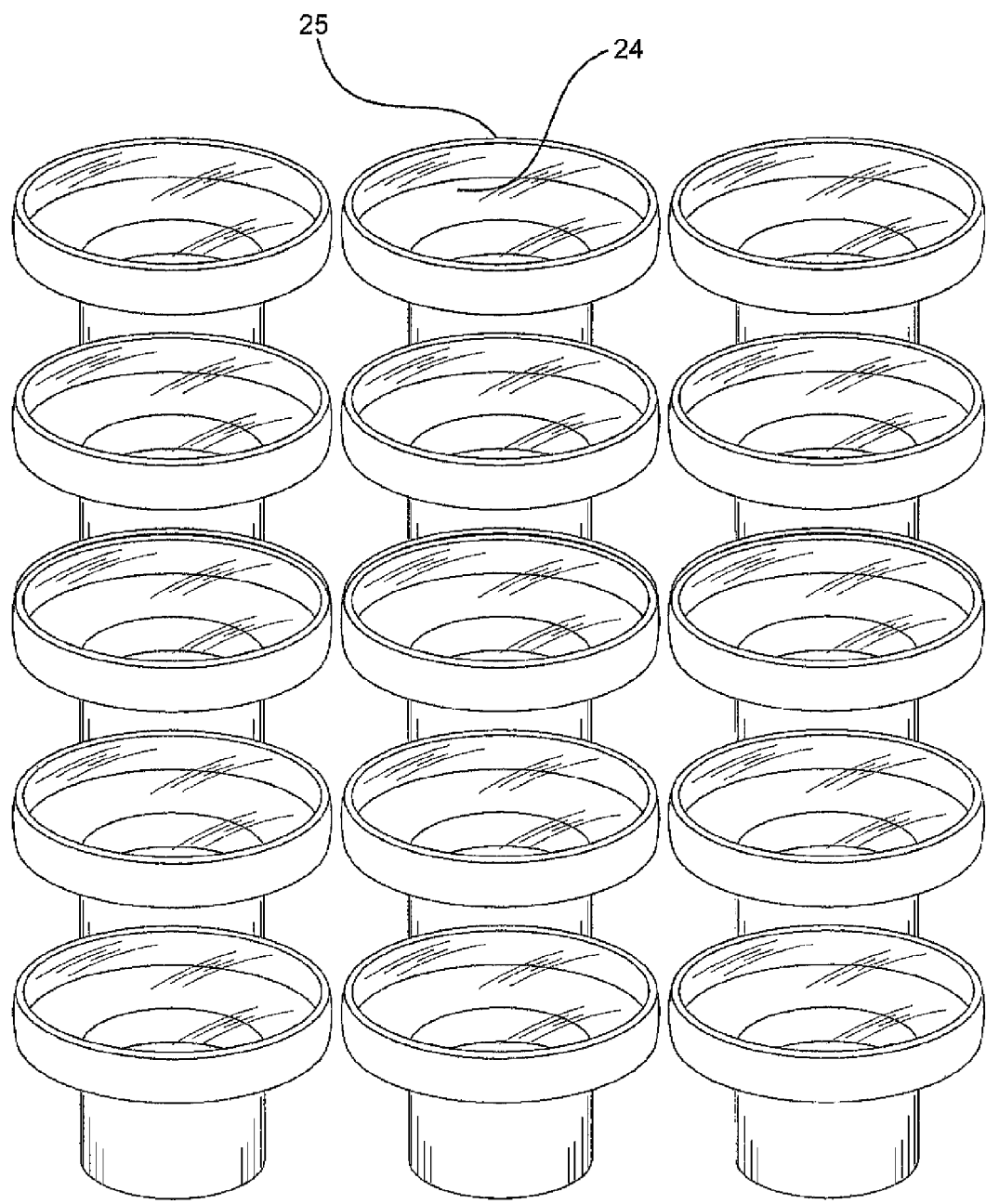
FIG. 4 shows a plurality of the lens assemblies useful with the present invention.

FIG. 4 shows a plurality of lens assemblies. The lens assemblies include a lens 24 that is a convex lens usually a biconvex lens that converges the ray of light at a focal point on the axis of the lens that is on the core of the solar collector. The focal length of the lens can be adjusted by the use of shims with respect to the housing or sleeve 25 that retains the lens. The sleeve is preferably a flexible rubbery material or polyvinyl chloride and rubber or a pvc fitting or other material. The sleeve surrounds at least a portion of the lens and retains the lens in the orifice of the cylinder drum. It also eliminates any issues due to different coefficients of expansion between the material the cylindrical drum is made from and the lens material. Also, the rubber sleeve can permit the distance of the lens from the core be adjusted to permit the focal point of the light to be focused on the surface of the core. It will be appreciated by those skilled in the art, that other arrangements for supporting the lens and adjusting the distance of the lens from the core in the cylindrical assembly are possible.

Figure 5:
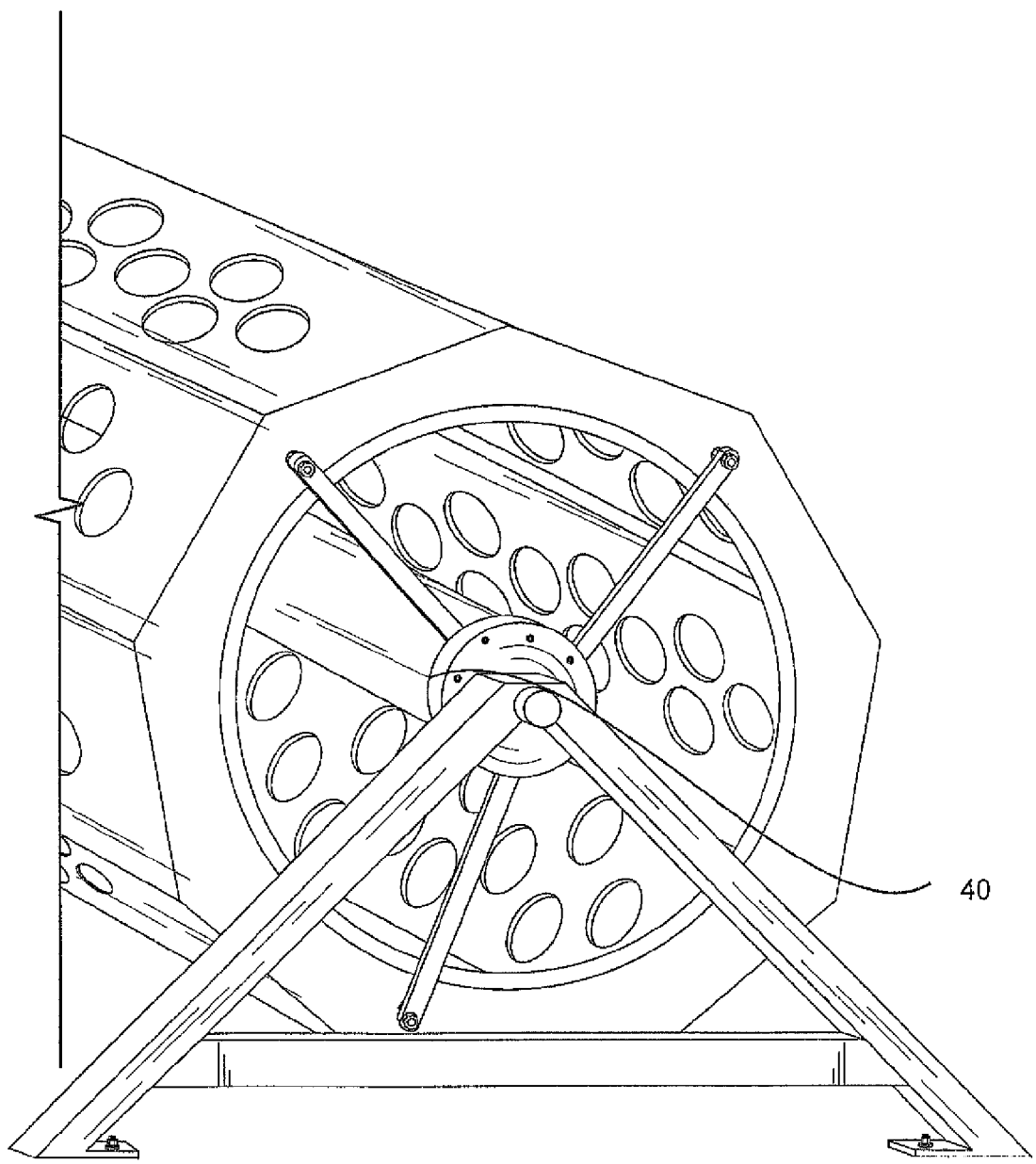
FIG. 5 shows a view all one end of the assembly of the present invention.

FIG. 5 shows a close up view of the cylindrical drum support on one end of the solar collector. These drum supports can be any shape and extend from the drum to a ring or bushing 40 that surrounds the center core. The cylindrical drum supports support the drum and the bearing or ring or bushing permits the drum to rotate about the center core. Also shown in FIG. 5 is the end of the center core.

In this embodiment there is a nipple 41 for securing the end of the core to the line that transports fluid to the center core for heating. The fluid can be any suitable fluid that can be heated and transport the heat to a heat exchanger. Water can be used, if desired, or oil or other suitable fluid. While potable water can be used in the system, it may be easier to use not potable water in the system and have potable water as the fluid in the heat exchanger. This may make it easier to keep the water used for household hot water purer.

Figure 6:
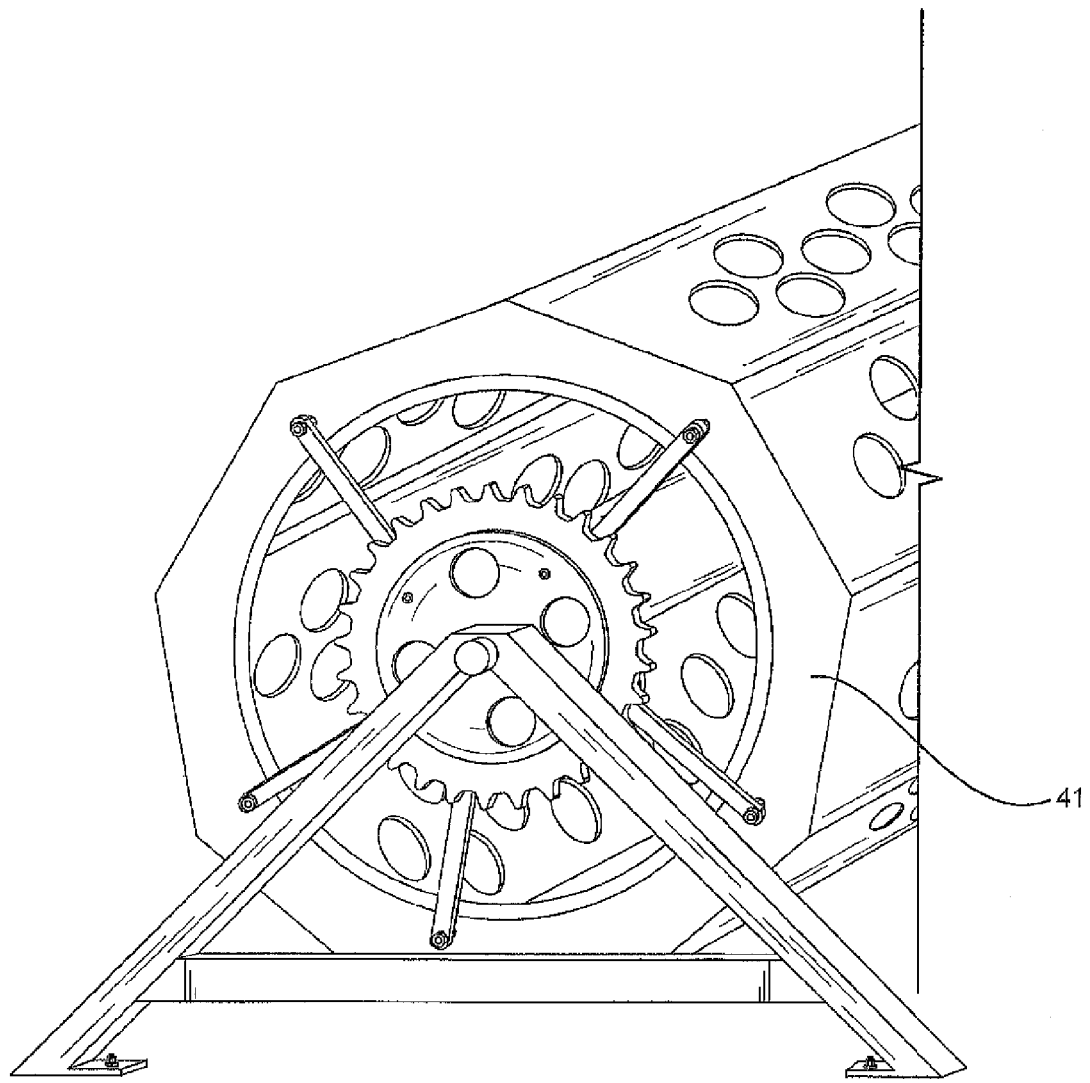
FIG. 6 shows a end view opposite the end of the assembly.

FIG. 6 shows the opposite end of the assembly of FIG. 5. As seen in the drawing there are a pair of supports 15 and 16 that meet at there ends where the end of the center core is rotatably secured. The toothed wheel which receives the drive sprockets is between the supports and the cylinder drum supports. In this example the cylinder drum supports are in the form of a rod 41 that extends outwardly of the end wall of the cylindrical drum. There is a generally 90° bend in the support so that the rod supports a ring not shown, not unlike the arrangement of the cylinder drum supports of FIG. 5. While different types of drum supports have been shown in FIGS. 5 and 6 it will be appreciated that other arrangements are possible.

Figure 7:
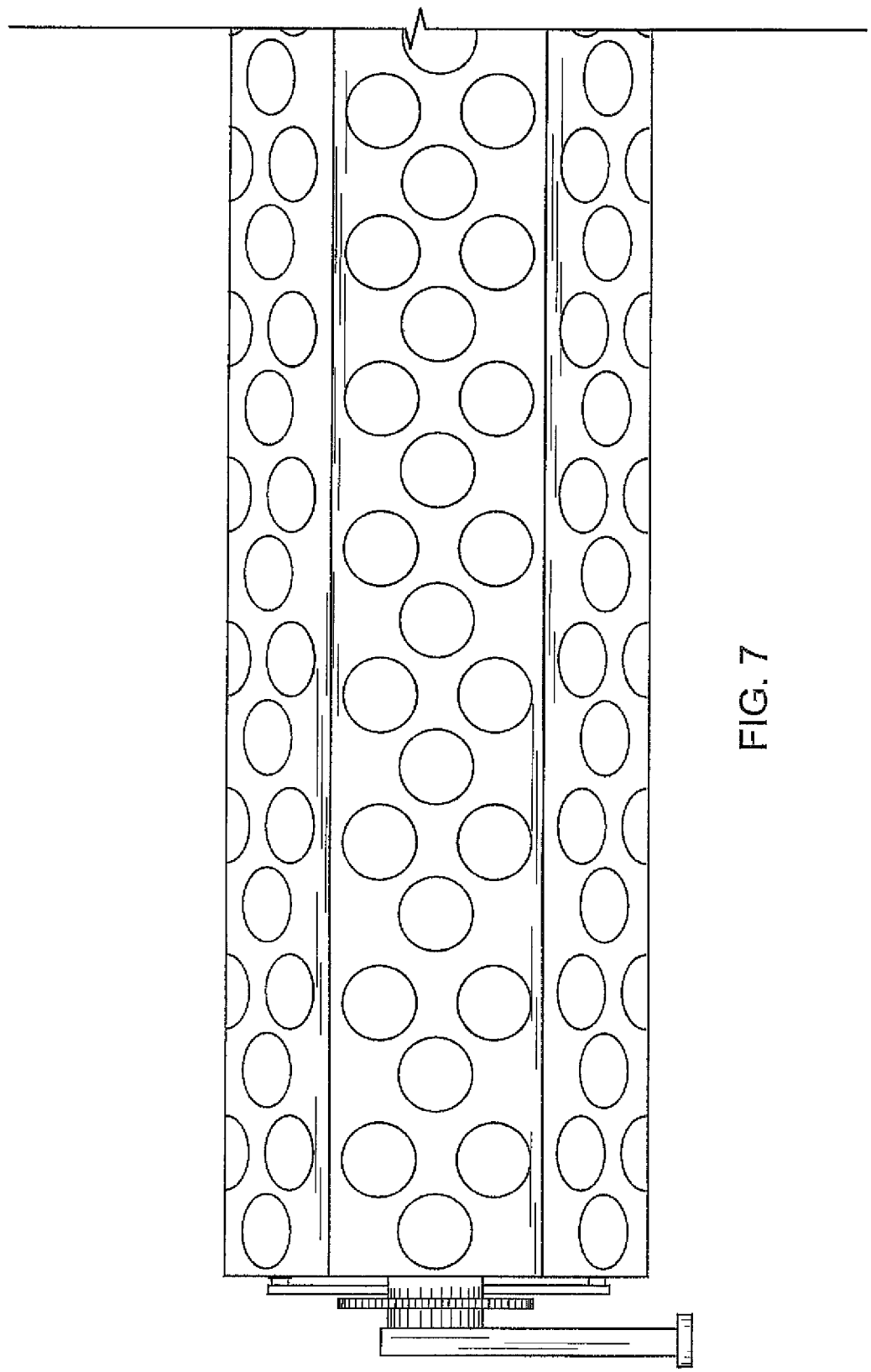
FIG. 7 shows a prospective side view of the device of the present invention without the lens assemblies being present.

FIG. 7 shows a side perspective view of a portion of the cylindrical drum of the present invention. In this embodiment, the drum is a nonagon of nine sides. It will be appreciated that depending on the diameter of the drum more or less sides are possible. Each side is preferably a flat sheet with a plurality of orifices present for receiving the lens assemblies. There are three rows of orifices extending generally from one end of the drum to the opposite end. As can be seen from the Figure, the lenses are offset in their alignment. More specifically, the three rows of lenses are generally parallel to each other but the arrangements of each row of lenses across the narrow portion of the strip do not line up in a straight line perpendicular to the rows. It will be appreciated that other arrangements of the orifices are possible.

Figure 8:
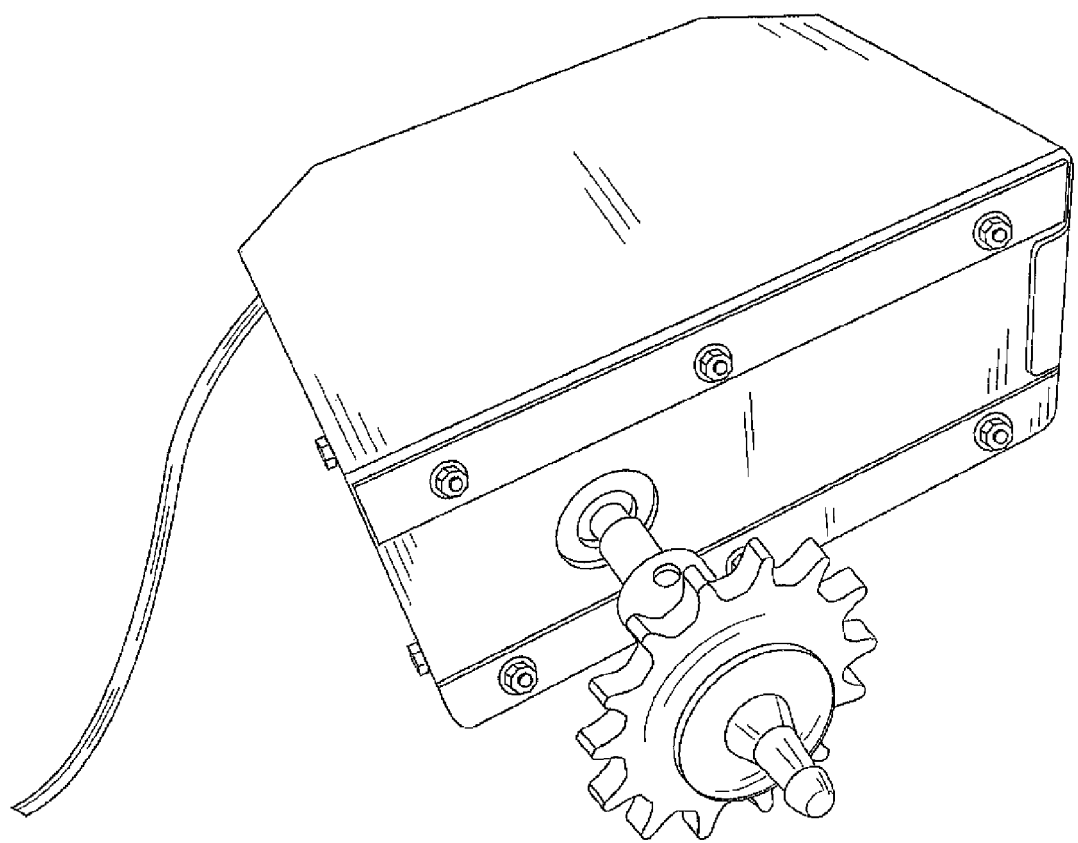
FIG. 8 shows an example of a motor used to rotate the assembly of the present invention.

FIG. 8 shows an example of a low speed motor that may be used to turn the cylindrical assembly. The motor of FIG. 8 has a toothed member on the stem of the motor that is used to turn the recesses in the sprocket drive.

Figure 9:
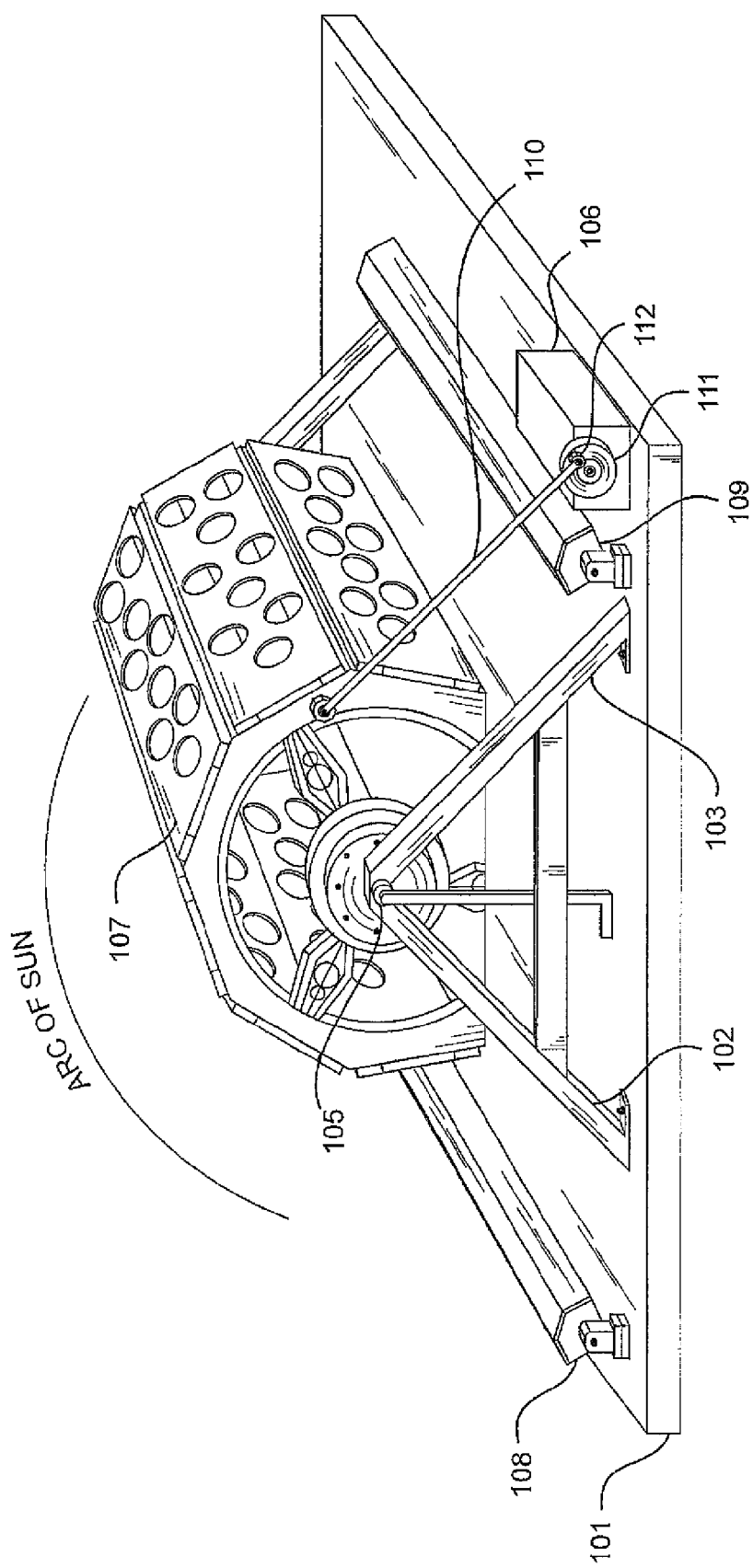
FIG. 9 shows another embodiment of the solar collector of FIG. 1 where the cylindrical housing is not a complete cylinder.

Another embodiment is disclosed in FIG. 9. As seen in FIG. 9, there is a base 101 on which is a first and second support 102,103 that supports one end of the solar collector of the present invention. There is also a support at the opposite end of the solar collector. The solar connector of this embodiment has a core 105 that has a fluid that passes through at least a portion of the core. The core may be retained in a ring like the ring shown in FIG. 4 or a suitable housing. The ring at each end permits the assembly to rock back and forth. There is a low speed motor 106 that is secured to the wall of the assembly. The low speed motor rocks the assembly back and forth as the motor rotates. The outer surface of the collector assembly is provided with a plurality of longitudinal strips 107 that provide a flat surface for receiving the lens assemblies. Generally parallel to the collector assembly and in proximity to the lower portion of the assembly are first and second bottom side reflectors 108 and 109.

Figure 10A:
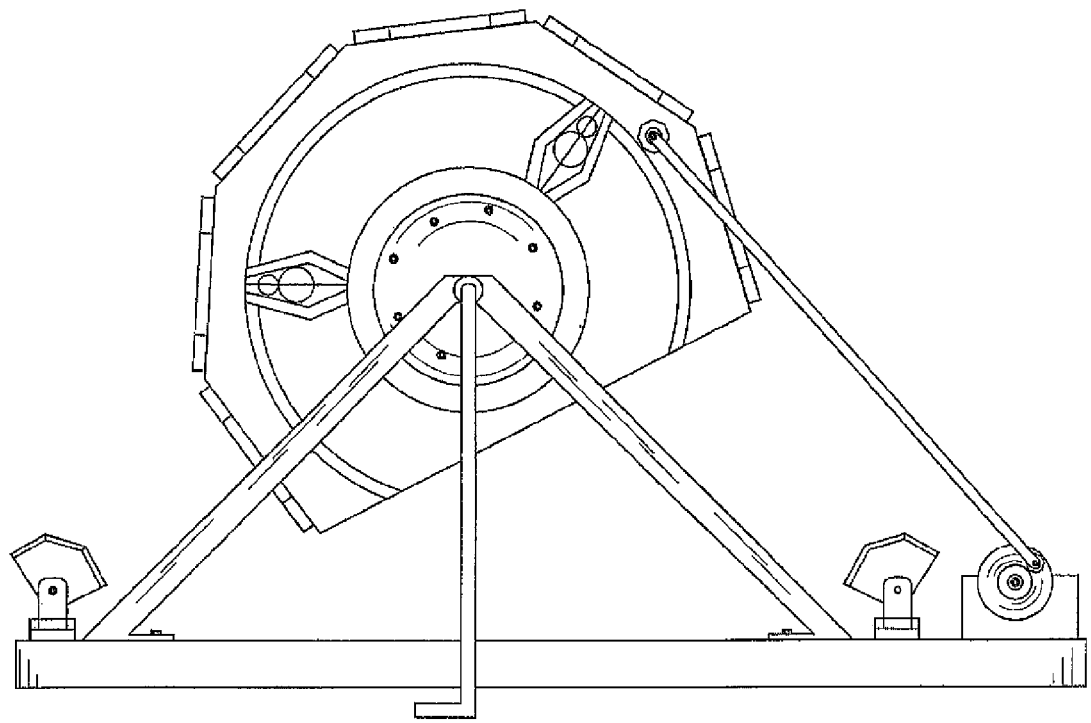
FIGS. 10A and 10B show the movement of the solar collector of FIG. 9.
Figure 10B:
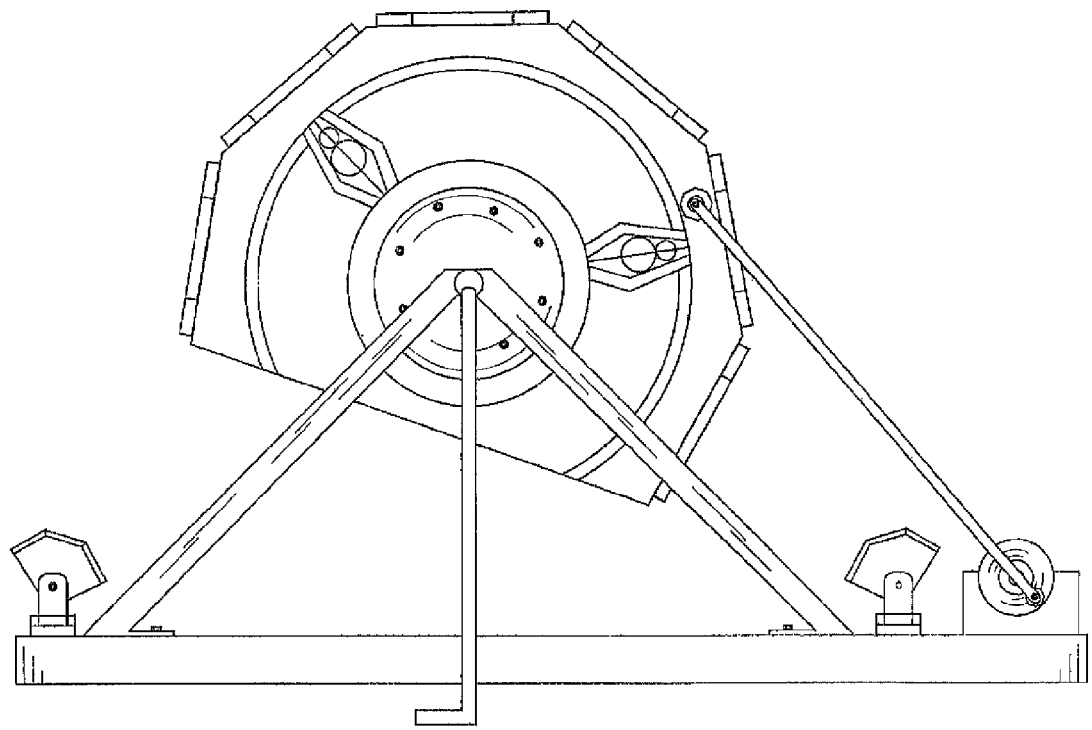

As the motor rotates the linkage 110 the linkage pivots or rocks the assembly back and forth causing the lens to have a greater opportunity to receive a direct beam of light from the sun during its travels. The motor has a cam 111 that is rotated by the motor. The linkage is secured to a pin 112 extending from the surface of the dish. The pin is not in the center of the disk. FIGS. 10A and 10B show the operation of the motor to rock the solar collector. As seen in FIG. 10A, there is a cam that has a pin or other means to secure a tie rod to the cam. As the cam rotates, the pin moves the tie rod back and forth thereby causing the solar collector to rock back and forth. The rocking back and forth causes the lens to move into and out of direct alignment with the sun. Because of the arrangement of the lens on the strips there is always one or more lenses that can focus light from the sun onto the core which has a fluid passing through. There is also a tie rod connection for securing one or more additional assemblies in a modular format.

FIG. 11 shows an example of a modular assembly of the solar collector of the present invention. In the modular assembly embodiment of FIG. 11A there is a lens holder 150 that has a flat surface 151 for supporting a plurality of lens assemblies. Extending from the lens surface there are first and second lens assembly supports 152 and 153 at each end of the strip. At the opposite end of the strip from the lens surface there is a collar 155 or bushing to support the core. This collar or bushing can be rubber if desired. In the example of FIG. 11A the lens assembly supports have an angle 154 to the center point of the core or axis of the core of about 40° where the assembly is cylinder as shown in FIG. 1 where the cylinder is a manogon. This angle changes based on the number of sides the polygon has as well as whether or not the assembly is forming a circular cylindrical member or something less than a circle. The other assemblies can have the same configuration as the one shown in FIG. 11A where the core passes through the ends of each or they can be secured together in some other manner such as a screw connection.

Figure 11A:
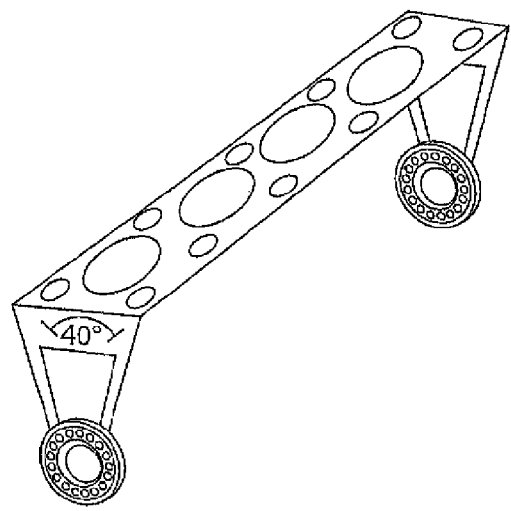
FIG. 11A to 11F show various views of the modular members that can make us the assembly of FIG. 9.
Figure 11B:
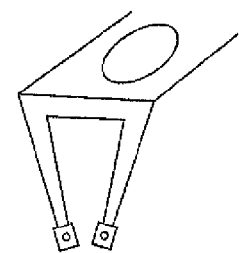
Figure 11C:
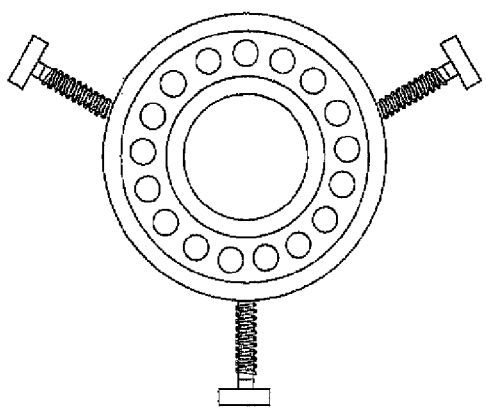
Figure 11D:
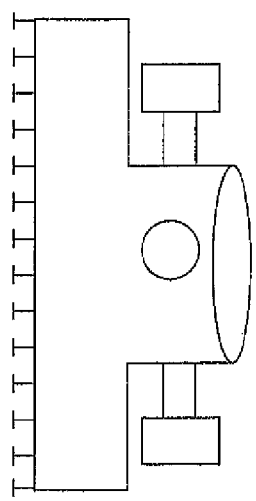
Figure 11E:
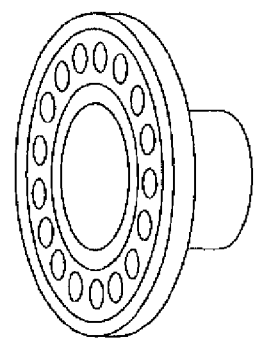
Figure 11F:
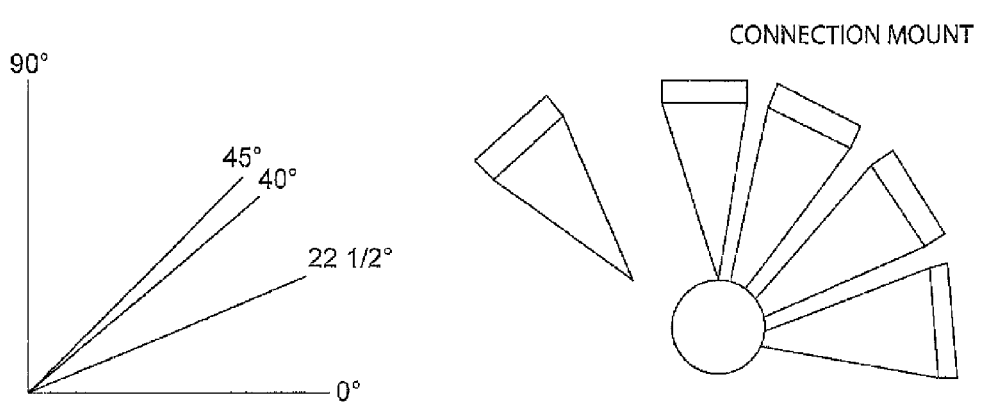

FIG. 11B shows an alternate embodiment of the lens assembly supports. In this embodiment there is a flat surface 151 extending from the flat surface are a pair of supports 160 and 101 which can be secured to a ring 162 by means of screws 163. The ends of the supports 160 and 161 may be provided with recesses for receiving the screws. FIG. 11C shows an end view of an example of the collar and how it may be secured by the screws to the supports 155 of the lens holder 150. FIG. 11D shows a side view of the collar. FIG. 11E shows a perspective view of the collar. It will be appreciated that other means of securing the collar to the supports are possible. FIG. 11F shows a profile of how the assemblies may be placed together to form the solar collector assembly.

Figure 12:
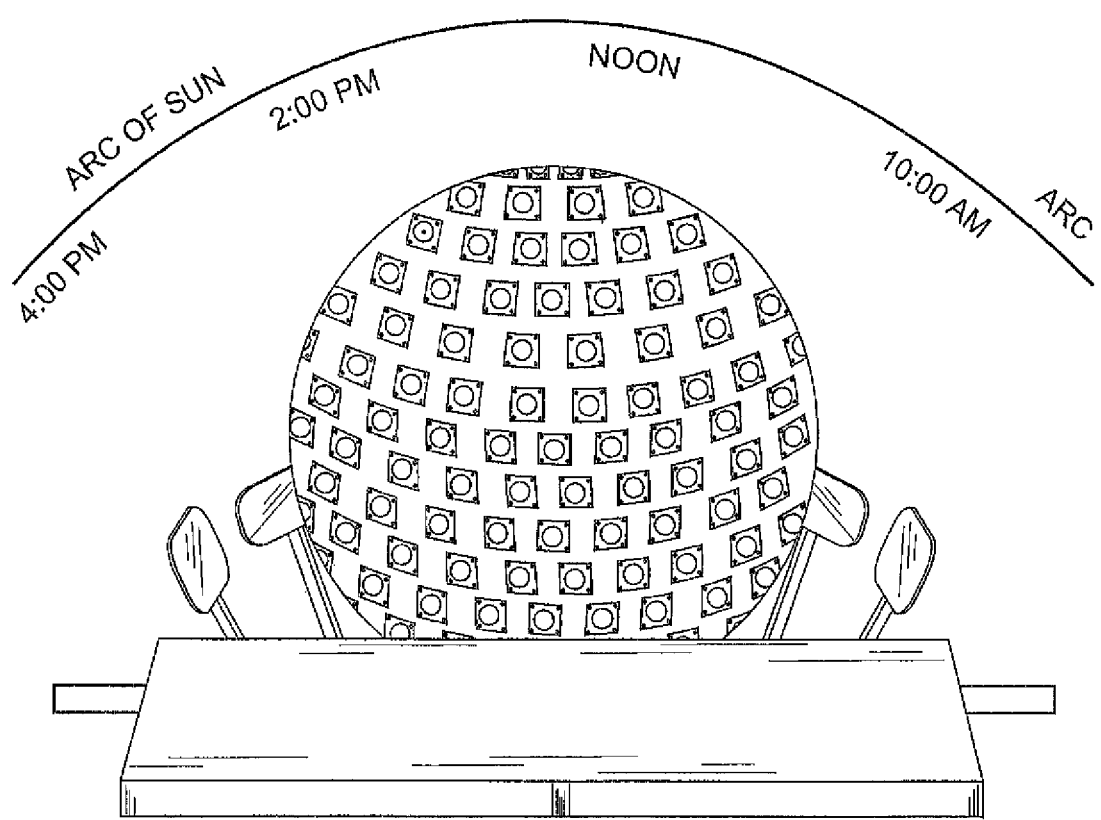
FIG. 12 shows an alternate embodiment of the present invention where the solar collector is in the form of a sphere.
Figure 13:
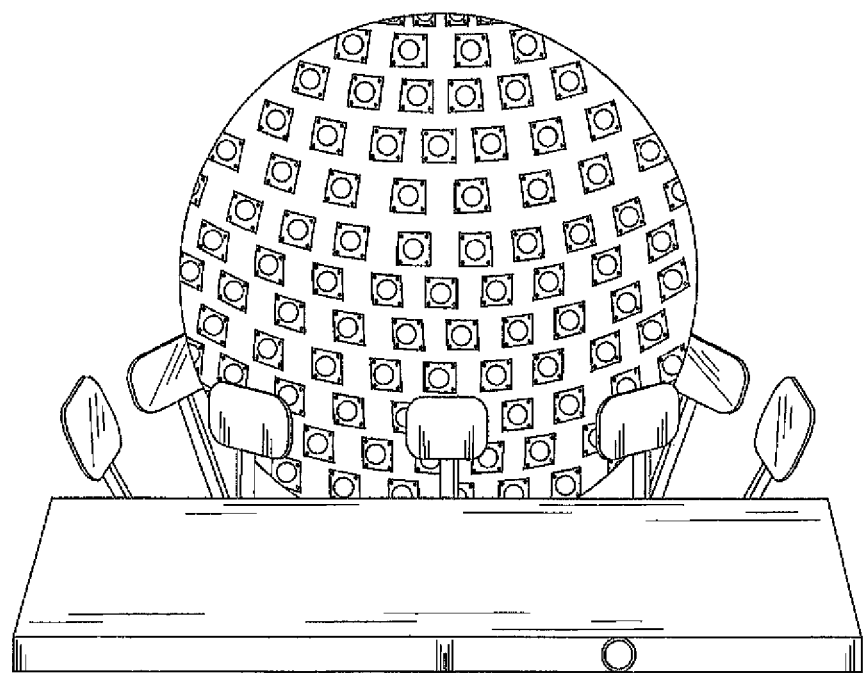
FIG. 13 is a side view of the embodiment of FIG. 12.
Figure 14:
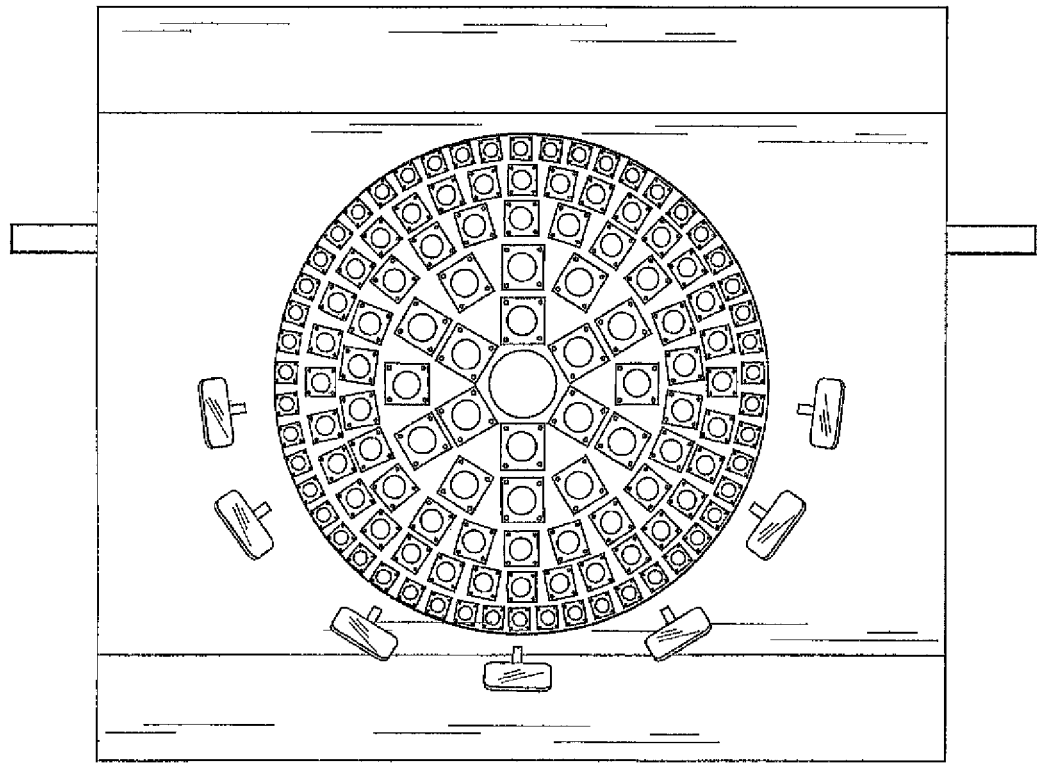
FIG. 14 is a top view of the embodiment of FIG. 12.

FIG. 12 shows an alternate embodiment of the present invention. In this embodiment the solar collector is spherical in shape with a plurality of lens assemblies positioned across the surface of the sphere. As can be seen from FIG. 12, the lens assemblies are positioned over a major portion of the surface of the sphere. Around at least a portion of the sphere may be a plurality of bottom side reflectors which direct light from the sun to the lower portion of the sphere. The sphere is positioned on a base which permits the sphere to be rotated by a motor, preferably an AC motor. The base may be provided with a fluid line. In one end water or other fluid comes in the line that brings fluid into the sphere where it is heated by the lenses. Water leaves the base through another line after it has been heated in the core of the sphere. The core, in this spherical embodiment, may be tubing that rises from the base into the sphere, and which may be enclosed therein by a corresponding glass shroud that may be evacuated similar to the cylindrical glass shroud discussed hereinabove. The sphere has a plurality of adjustable individual lenses as discussed above so that the focal length can be adjusted. The sphere preferably is open to the inside for cleaning, etc. FIG. 13 shows a side view of the embodiment of FIG. 12 and FIG. 14 shows a top view. In this embodiment the bottom side reflectors are positioned in a semicircle around the north side of the sphere.

Figure 15:
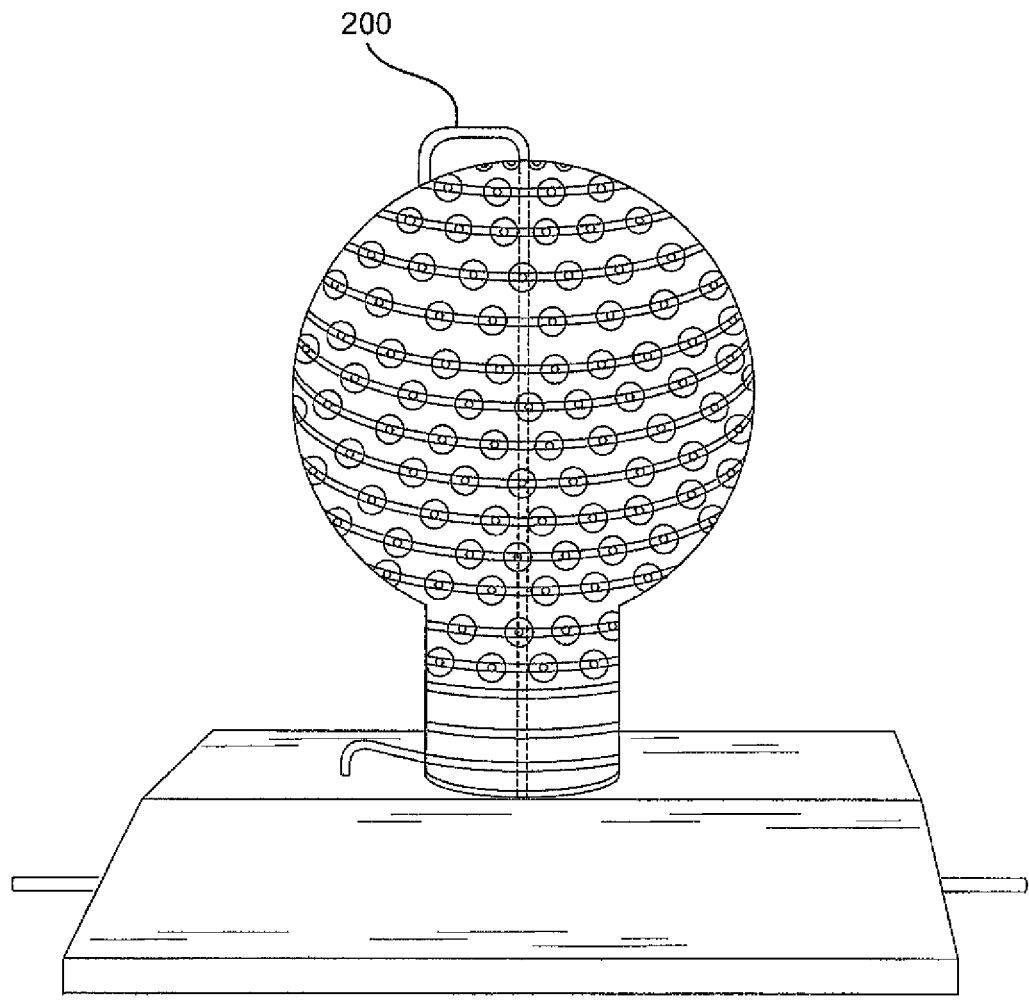
FIG. 15 is an alternate embodiment of the sphere of FIG. 12 showing the inner sphere.
Figure 16:
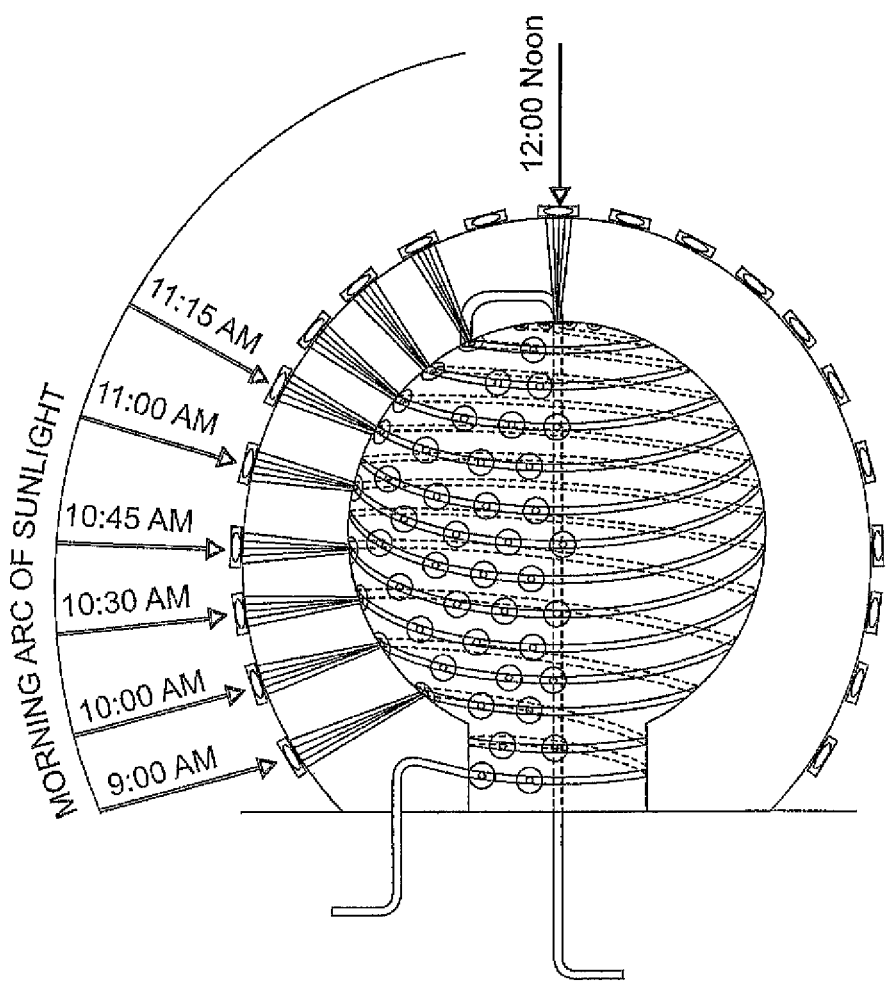
FIG. 16 is a cutaway view of the embodiment of FIG. 12.

In the embodiment drawn in FIG. 15 there is an inner sphere of a tube 200 that is used to transport fluid from an outside source through the solar collector to a heat exchanger or other location where the heat generated by the device is used. The tube forms a sphere that spirals around the interior of the device. When the tube reaches the peak of the sphere, it passes downwardly from the top of the sphere to the base where it exits. The outer sphere is shown more clearly in FIG. 12 which surrounds the inner sphere. When light is directed onto the tubing by the lenses, the fluid, such as water, is heated. The inner sphere of tubing can be supported by an inner sphere or it can comprise the inner sphere. A pump may be used to circulate the fluid through the device. FIG. 16 shows how the lenses on the external sphere focus the light onto the tubing. As the sun traverses the sky, different lenses direct the focused light onto the tubing so that there is continuous heating. This is assisted by revolving the outer globe around the inner heat sink framed by the tubing. It is believed that the average direct contact of the sun's heat through the lens striking the tube or fittings which support the tubing will be greater with the rotation than if there was just the sun's motion without the rotation of the lenses.

Figure 17:
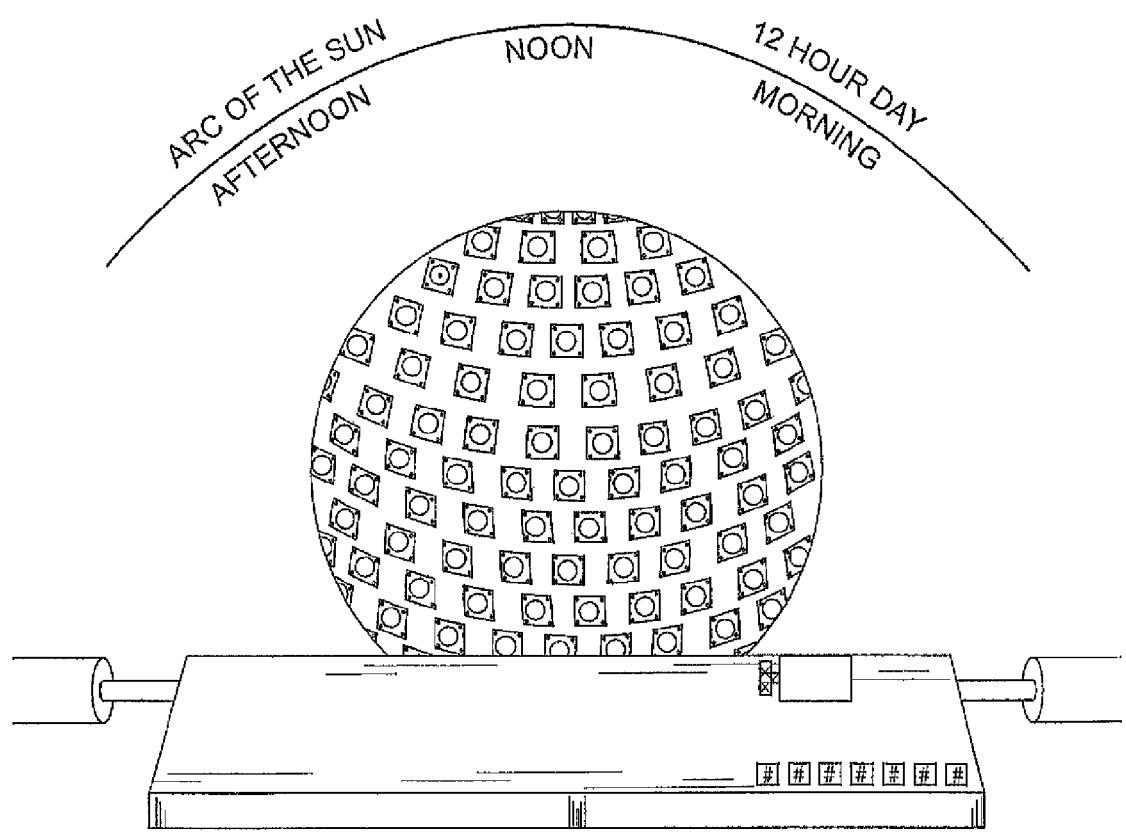
FIG. 17 is an embodiment where the solar collector is a more than a hemisphere but less than a complete sphere.

In FIG. 17 the assembly is in the form of a hemisphere or a three dimensional object that has an arc greater than 180° but less than 360°. The external sphere is mounted on a turntable that rotates the hemisphere at a selected rate of speed. Bottom side mirrors direct light toward the lower portions of the outer sphere. The lens may have fixed focal lengths or may be adjustable. The base may be adjustable so that the device is in proper alignment with respect to the plane of the earth. Alternatively, the base can be positioned on a roof.

Figure 5A:
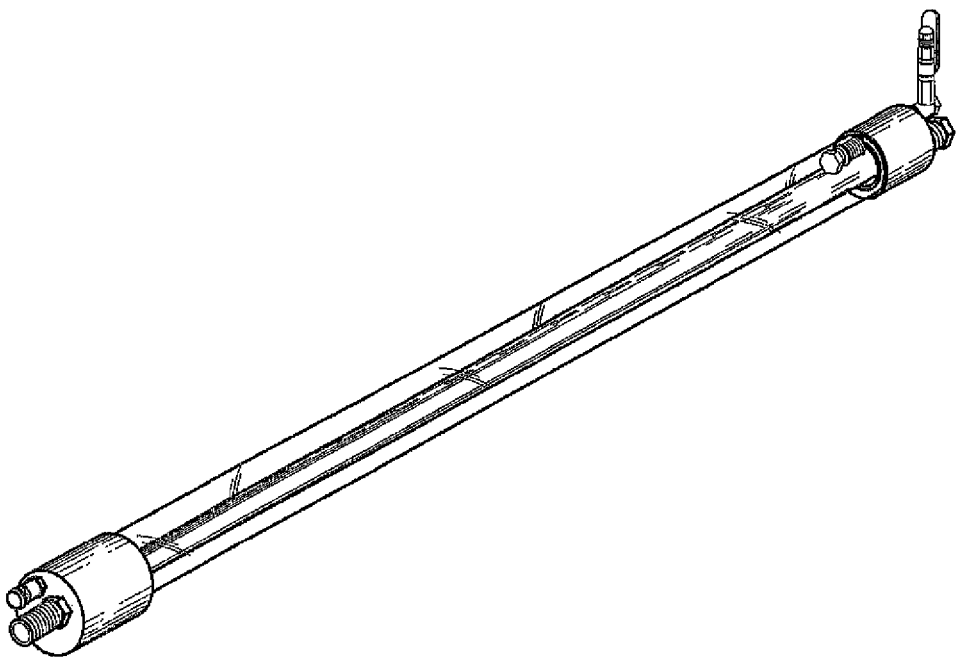
FIG. 5A shows an enlarged perspective view of the evacuated glass shroud, end caps, with a tube therein being connected to end fittings in the caps, according to one embodiment the current invention.
Figure 5B:
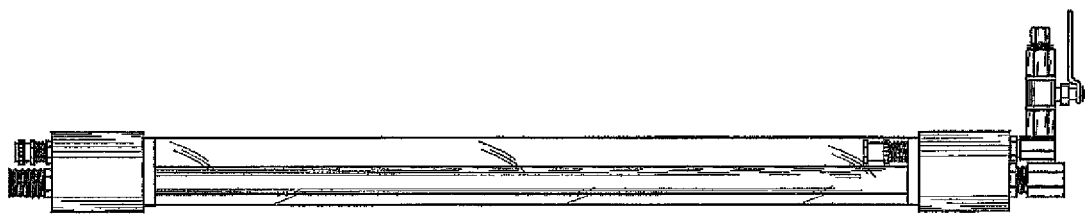
FIG. 5B is a first side view of the glass shroud, end caps, tube, and end fittings of FIG. 5A, looking at the side of the valve.
Figure 5C:
FIG. 5C is a second side view of the glass shroud, end caps, tube, and end fittings of FIG. 5A, looking at a first end of the valve.
Figure 5D:
FIG. 5D is a third side view of the glass shroud, end caps, tube, and end fittings of FIG. 5A, looking at a second end of the valve.
Figure 5E:
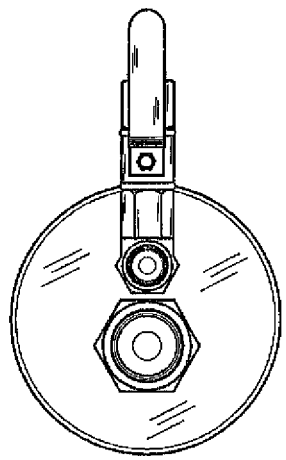
FIG. 5E is a first side view of the glass shroud, end caps, tube, and end fittings of FIG. 5A.
Figure 5F:
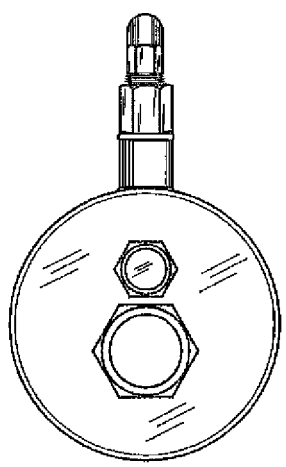
FIG. 5F is a second side view of the glass shroud, end caps, tube, and end fittings of FIG. 5A.

FIG. 5A shows a detail view of one embodiment of the central core from FIG. 5. A central black pipe or tube, in one embodiment, may be one inch in diameter and may be thirty-eight inches long (although other sizes could also be used). This black pipe may be coated with a matte black high heat spray paint so as to absorb and not reflect suns rays, to thereby be efficiently heated. A 2½ inch Pyrex high heat high pressure glass tube (shroud) may be mounted over and around that black pipe using end caps, so as to suspend the black pipe within the center of the Pyrex tube. The end caps may each be 2¾ inches wide and may engage both ends of the Pyrex tube. The chamber depth of the end caps is then filled on each end with Liquid marine resin and allowed to harden. A narrow ⅛th inch airway (valve) may be inserted in one end next to black pipe to be able to evacuate the air therein to create a vacuum within the chamber. The hollow black pipe may stick out beyond both end caps, so as to allow fluid to pass through the end cap and not invade the space that has been evacuated in between the exterior of the black pipe and the interior of the Pyrex shroud. A connector may be threadably engaged onto the protruding ends of the black pipe that extend past the end caps, which may be used to permit the fluid to re circulate into the hot zone in the black tube, and back to a holding tank. An electric suction pump is attached to the ⅛th inch nipple and a rotating ball valve can be closed once the desired vacuum is obtained, after which a second sealing after the ball valve is a dead plug is inserted to maintain a sealed environment within vacuum tube. The vacuum pump is removed and the chamber is sealed. The core is now ready for utilization The vacuum created between the black pipe and the glass shroud serves to retain and maintain heat similar to the vacuum used in the chamber between the inner compartment and the outer shell of a coffee thermos. The lack of air between the black pipe and the Pyrex tube insulates the captured heat when sun is reflected upon the black tubing, hence preheating and maintaining a hot pipe which water passes through and re circulates from a holding tank . . . or in best case boils water in another pot by submerging the re circulating coils fluid within it.

I claim:

1. A solar collection device, for use in providing hot water, said solar collection device comprising:
    a base:
    a solar energy collector assembly, said base configured to receive and support said solar energy collector assembly, said solar energy collector assembly comprising:
        one or more lenses;
        an elongated holder, said one or more lenses adjustably secured within an orifice in said holder to be proximate to an outer surface of said elongated holder;
        a cylindrical glass shroud having a first end and a second end, said elongated holder configured to support said cylindrical glass shroud with the axis of said cylindrical glass shroud being positioned generally coaxial with the axis of said elongated holder;
        a tube, said tube having a first end configured to receive a supply of water, and a second end configured to output the supply of water, a portion of said tube being received within said glass shroud and being supported therein by a first cap at said first end of said glass shroud, and by a second cap at said second end of said glass shroud, said first cap comprising a valve configured to permit said glass shroud to be evacuated; and
    wherein said one or more lenses are adjustably secured on said elongated holder to have a focal point configured to be proximate to the outer surface of said tube.

2. The solar collection device according to claim 1, wherein said base is configured to rotatably support said solar collector assembly.

3. The solar collection device according to claim 1, further comprising a drive means configured to rotate said solar collector assembly at a slow speed.

4. The solar collection device according to claim 1, further comprising a drive means configured to rock said solar collector assembly at a slow speed.

5. The solar collection device according to claim 1, wherein said elongated holder comprises a hollow cylindrical tube.

6. The solar collection device according to claim 1, wherein said elongated holder comprises a polygonal cross-sectional shape.

7. The solar collection device according to claim 6, wherein said polygonal cross-sectional shape of said elongated holder comprises a nonagon.

8. The solar collection device according to claim 7, wherein said one or more lenses comprises a plurality of lenses; and wherein each side of said elongated nonagonal holder receives a plurality of said lenses.

9. The solar collection device according to claim 8, wherein said plurality of lenses on each side of said elongated nonagonal holder is arranged to be in-line.

10. The solar collection device according to claim 9, wherein said plurality of lenses on each side of said elongated nonagonal holder is arranged to be staggered thereon.

11. The solar collection device according to claim 10, wherein each of said plurality of lenses are received within an adjustable flexible sleeve in said elongated holder, said adjustable flexible sleeve configured to adjust a distance of said lens from said tube.

12. The solar collection device according to claim 11, wherein said flexible sleeve comprises a flexible rubber configured to cushion said lenses in said elongated holder, and further configured to prevent damage from thermal expansion of said holder.

13. The solar collection device according to claim 12, wherein said tube is made of a material having a high thermal transmittance value.

14. The solar collection device according to claim 1, comprising one or more elongated reflectors extending beside said elongated holder, and configured to reflect sunlight toward said lenses being disposed on a side or on a bottom of said elongated nonagonal holder.

15. The solar collection device according to claim 14, wherein said one or more elongated reflectors are configured pivot about an axis being parallel to the axis of said holder.

16. The solar collection device according to claim 15, wherein said one or more elongated reflectors comprise: a parabolic; a hyperbolic mirror.

17. The solar collection device according to claim 15, wherein said one or more elongated reflectors comprises an elongated three-sided member having first mirrored surface a first side, a second mirrored surface on a second side, and a third mirrored surface on a third side; and wherein said elongated three-sided member is configured to pivot relative to said elongated holder.

18. The solar collection device according to claim 1, comprising a heat exchanger, said heat exchanger configured receive a portion of said tube therein to heat potable water heat water.

19. The solar collection device according to claim 1, comprising an elevation means configured to raise or lower an end of said device to compensate for the seasonal tilt of the sun.

* * * * *